US009965689B2

(12) United States Patent
dos Santos Mendonca et al.

(10) Patent No.: US 9,965,689 B2
(45) Date of Patent: May 8, 2018

(54) GEOMETRIC MATCHING IN VISUAL NAVIGATION SYSTEMS

(71) Applicant: QUALCOMM Incorporated, San Diego, CA (US)

(72) Inventors: Paulo Ricardo dos Santos Mendonca, Seattle, WA (US); Christopher Brunner, San Diego, CA (US); Arvind Ramanandan, San Diego, CA (US); Murali Ramaswamy Chari, San Diego, CA (US); Dheeraj Ahuja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 15/178,505

(22) Filed: Jun. 9, 2016

(65) Prior Publication Data
US 2017/0357858 A1    Dec. 14, 2017

(51) Int. Cl.
*G06K 9/00* (2006.01)
*G01C 21/00* (2006.01)
(Continued)

(52) U.S. Cl.
CPC ......... *G06K 9/00791* (2013.01); *G01C 21/00* (2013.01); *G06K 9/6201* (2013.01);
(Continued)

(58) Field of Classification Search
CPC .. G05D 1/0274; G05D 1/0088; G05D 1/0246; G05D 1/024; G05D 1/0251;
(Continued)

(56) References Cited

U.S. PATENT DOCUMENTS 6,675,386 B1 * 1/2004 Hendricks .......... H04N 7/17318
                                                    348/143
6,714,665 B1 * 3/2004 Hanna ..................... G06K 9/00
                                                    382/106
(Continued)

FOREIGN PATENT DOCUMENTS

EP    2455915 A1    5/2012
EP    2538387 A1    12/2012
(Continued)

OTHER PUBLICATIONS

Partial International Search Report—PCT/US2017/030842—ISA/EPO—dated Sep. 1, 2017.
(Continued)

*Primary Examiner* — Aklilu Woldemariam
(74) *Attorney, Agent, or Firm* — Silicon Valley Patent Group LLP

(57) ABSTRACT

A first map comprising local features and 3D locations of the local features is generated, the local features comprising visible features in a current image and a corresponding set of covisible features. A second map comprising prior features and 3D locations of the prior features may be determined, where each prior feature: was first imaged at a time prior to the first imaging of any of the local features, and lies within a threshold distance of at least one local feature. A first subset comprising previously imaged local features in the first map and a corresponding second subset of the prior features in the second map is determined by comparing the first and second maps, where each local feature in the first subset corresponds to a distinct prior feature in the second subset. A transformation mapping a subset of local features to a subset of prior features is determined.

30 Claims, 8 Drawing Sheets

(51) Int. Cl.
*G06K 9/62* (2006.01)
*G06T 7/20* (2017.01)
*G06T 7/30* (2017.01)
*G01C 21/16* (2006.01)
*G01S 19/42* (2010.01)

(52) U.S. Cl.
CPC .............. *G06K 9/6211* (2013.01); *G06T 7/20* (2013.01); *G06T 7/30* (2017.01); *G01C 21/165* (2013.01); *G01S 19/42* (2013.01); *G06K 9/00* (2013.01); *G06T 2200/04* (2013.01); *G06T 2207/30244* (2013.01)

(58) Field of Classification Search
CPC .. G05D 1/0253; G05D 1/0255; G05D 1/0257;
G05D 1/027; G05D 1/0272; G05D
1/0278; G05D 1/0297; G05D 2201/0209;
G05D 2201/0215; G06K 9/52; G05B
15/02; G05B 2219/2642; G08B 13/19602;
G08B 19/00; G08B 25/008; G08B 25/08;
G08B 25/14; G08B 13/00; H04L
12/2803; H04L 12/2827; H04L 63/1416;
H04L 63/1425; H04L 63/302; G06T
2207/20164; G06T 2207/30044; G06T
2207/30048; G06T 2207/30196; G06T
2207/30204; G06T 2207/30212; G06T
2207/30241; G06T 2207/30252; G06T
7/174; G06T 7/20; G06T 7/215; G06T
7/248; H04N 7/183; H04N 2005/44521;
H04N 21/43615; H04N 21/44213; H04N
5/23293; H04N 5/445; H04N 13/0296;
H04N 13/0497; H04N 21/21805; H04N
21/2221; H04N 21/2343; H04N
21/23439; H04N 21/4622
USPC .......... 382/104, 153, 190; 348/46, 143, 153,
348/154; 701/2, 28
See application file for complete search history.

(56) References Cited

U.S. PATENT DOCUMENTS

| 7,194,114 | B2* | 3/2007 | Schneiderman | G06K 9/527 |
| | | | | 382/118 |
| 7,400,744 | B2* | 7/2008 | Nichani | G06K 9/00771 |
| | | | | 382/103 |
| 7,460,148 | B1* | 12/2008 | Clark | H04N 7/183 |
| | | | | 340/539.13 |
| 7,925,049 | B2* | 4/2011 | Zhu | G06K 9/32 |
| | | | | 382/103 |
| 8,655,094 | B2* | 2/2014 | Miller | G01C 11/04 |
| | | | | 33/503 |
| 8,774,517 | B1* | 7/2014 | Khosla | G06K 9/4623 |
| | | | | 348/231.3 |
| 8,824,802 | B2* | 9/2014 | Kutliroff | G06K 9/00201 |
| | | | | 348/143 |
| 2004/0213438 | A1* | 10/2004 | Liu | G06K 9/00201 |
| | | | | 382/118 |
| 2005/0069207 | A1* | 3/2005 | Zakrzewski | B64D 45/0015 |
| | | | | 382/190 |
| 2005/0169529 | A1* | 8/2005 | Owechko | G06K 9/469 |
| | | | | 382/190 |
| 2008/0027591 | A1 | 1/2008 | Lenser et al. | |
| 2009/0237492 | A1* | 9/2009 | Kikinis | H04N 13/0296 |
| | | | | 348/47 |
| 2010/0098342 | A1* | 4/2010 | Davis | G06K 9/0063 |
| | | | | 382/220 |
| 2012/0106800 | A1* | 5/2012 | Khan | G06K 9/00651 |
| | | | | 382/104 |
| 2012/0121161 | A1* | 5/2012 | Eade | G09B 29/007 |
| | | | | 382/153 |
| 2012/0190386 | A1* | 7/2012 | Anderson | G01C 15/04 |
| | | | | 455/456.3 |
| 2012/0208592 | A1* | 8/2012 | Davis | H04W 4/001 |
| | | | | 455/556.1 |
| 2012/0249787 | A1* | 10/2012 | Allegra | H04N 7/18 |
| | | | | 348/143 |
| 2013/0215264 | A1* | 8/2013 | Soatto | G06K 9/4671 |
| | | | | 348/143 |
| 2014/0098094 | A1* | 4/2014 | Neumann | G06T 17/10 |
| | | | | 345/420 |
| 2014/0169623 | A1* | 6/2014 | Liu | G06K 9/00335 |
| | | | | 382/103 |
| 2015/0110355 | A1 | 4/2015 | Dill | |
| 2015/0163345 | A1* | 6/2015 | Cornaby | G06F 3/04847 |
| | | | | 345/633 |
| 2015/0163459 | A1* | 6/2015 | Jovicic | H04N 7/183 |
| | | | | 348/143 |
| 2015/0209673 | A1* | 7/2015 | Martini | G06T 7/0008 |
| | | | | 463/31 |
| 2015/0261223 | A1* | 9/2015 | Fong | G05D 1/0274 |
| | | | | 700/253 |
| 2017/0103264 | A1* | 4/2017 | Javan Roshtkhari | G06K 9/00718 |

FOREIGN PATENT DOCUMENTS

WO  WO-2015031854      3/2015
WO     2015048434 A1   4/2015

OTHER PUBLICATIONS

International Search Report and Written Opinion—PCT/US2017/030842—ISA/EPO—dated Oct. 30, 2017.

\* cited by examiner

500

| 510 Feature Identifier | 515 3D location | 520 3D Location Uncertainty | 525 Associated Cubes* | 530 Covisible Features* | 535 Time First Seen | ... |

| 555 Cube Identifier | 560 3D Range | 565 Neighboring Cubes* | 570 Associated Features* | ... |

FIG. 5B

GEOMETRIC MATCHING IN VISUAL NAVIGATION SYSTEMS

FIELD

The subject matter disclosed herein relates generally to visual navigation systems, and, in particular, to systems and methods for maintaining accuracy and precision in visual navigation systems.

BACKGROUND

Smartphones and other mobile devices are increasingly used for visual navigation. In visual navigation (VN) systems (VNS), visual-inertial-odometry (VIO), or Vision Based Positioning (VBP) systems (collectively referred to as "VNS" herein) images captured by a camera are used in conjunction with other sensor or wireless measurements for location determination and/or to estimate a trajectory of the mobile device.

The term "odometry" refers to the estimation of changes in position over time based on measurements from sensors. As used herein, the term "Visual Inertial Odometry" (VIO) refers to both odometry using a combination of images and other sensor based measurements as well odometry based on images. In VIO, several visual features may be tracked from frame to frame and used to determine an accurate estimate of relative camera motion.

In traditional VNS, visual or appearance based feature matching between images is used to determine a pose of the mobile device. Traditional VNS' suffer from "pose drift" (or drift), which describes the error between the actual position of the mobile device and a VN determined position of the mobile device. One approach to reducing or mitigating pose drift is "loop closure". Pose drift or drift occurs because of residual errors in pose computation for an individual frame and from the accumulation of such errors from frame to frame. In loop closure, a mobile device may determine if, after some arbitrary length of time, a currently viewed feature corresponds to some previously viewed feature on its trajectory. The position and/or trajectory of the mobile device may then be corrected based on one or more of: current camera pose, the previously estimated location of the feature and/or the corresponding previous camera pose, thereby decreasing the impact of pose drift. However, as the length of time increases, the search space of feature points that need to be visually matched to determine if a loop closure event has occurred increases significantly—thereby limiting applicability. Moreover, because the appearance of a feature may change based on viewpoint and/or illumination, loop closure based solely on visual or appearance based feature matching may be challenging.

SUMMARY

In some embodiments, a processor-implemented method on a user equipment (UE) may comprise: generating based, in part on an estimated camera pose for a current image frame, a first map comprising local features and 3D locations of the local features, wherein the local features comprise a plurality of visible features in the current image frame and a set of covisible features corresponding to the plurality of visible features; determining a second map comprising prior features and 3D locations corresponding to the prior features, wherein each prior feature was first imaged at a time prior to the first imaging of any of the local features, and wherein each prior feature is within a threshold distance of at least one local feature; determining, based on a comparison of the first map to the second map, a first subset comprising previously imaged local features in the first map and a corresponding second subset of the prior features in the second map, wherein each local feature in the first subset corresponds to a distinct prior feature in the second subset; and determining a transformation, wherein the transformation maps the first subset of the local features to the second subset of the prior features.

In another aspect, a User Equipment (UE) may comprise: at least one image sensor capable of capturing images; and a processor coupled to the image sensor, wherein the processor is configured to: generate based, in part on an estimated camera pose for a current image frame, a first map comprising local features and 3D locations of the local features, wherein the local features comprise a plurality of visible features in the current image frame and a set of covisible features corresponding to the plurality of visible features; determine a second map comprising prior features and 3D locations corresponding to the prior features, wherein each prior feature was first imaged at a time prior to the first imaging of any of the local features, and wherein each prior feature is within a threshold distance of at least one local feature; determine, based on a comparison of the first map to the second map, a first subset comprising previously imaged local features in the first map and a corresponding second subset of the prior features in the second map, wherein each local feature in the first subset corresponds to a distinct prior feature in the second subset; and determine a transformation, wherein the transformation maps the first subset of the local features to the second subset of the prior features.

In a further aspect, a User Equipment (UE) may comprise: image sensing means capable of capturing images; and processing means coupled to the image sensing means, wherein the processing means comprises: image sensing means capable of capturing images; means for generating based, in part on an estimated camera pose for a current image frame, a first map comprising local features and 3D locations of the local features, wherein the local features comprise a plurality of visible features in the current image frame and a set of covisible features corresponding to the plurality of visible features; means for determining a second map comprising prior features and 3D locations corresponding to the prior features, wherein each prior feature was first imaged at a time prior to the first imaging of any of the local features, and wherein each prior feature is within a threshold distance of at least one local feature; means for determining, based on a comparison of the first map to the second map, a first subset comprising previously imaged local features in the first map and a corresponding second subset of the prior features in the second map, wherein each local feature in the first subset corresponds to a distinct prior feature in the second subset; and means for determining a transformation, wherein the transformation maps the first subset of the local features to the second subset of the prior features.

In another aspect, a non-transitory computer readable medium may comprise instructions, which when executed by a processor, cause the processor to: generate based, in part on an estimated camera pose for a current image frame, a first map comprising local features and 3D locations of the local features, wherein the local features comprise a plurality of visible features in the current image frame and a set of covisible features corresponding to the plurality of visible features; determine a second map comprising prior features and 3D locations corresponding to the prior features, wherein each prior feature was first imaged at a time prior to the first imaging of any of the local features, and wherein each prior feature is within a threshold distance of at least one local feature; determine, based on a comparison of the first map to the second map, a first subset comprising previously imaged local features in the first map and a corresponding second subset of the prior features in the second map, wherein each local feature in the first subset corresponds to a distinct prior feature in the second subset; and determine a transformation, wherein the transformation maps the first subset of the local features to the second subset of the prior features.

The methods disclosed may be performed by one or more UE's mobile stations, mobile devices, robots, vehicles including drones etc. using Visual Inertial Odometry. Embodiments disclosed also relate to software, firmware, and program instructions created, stored, accessed, read or modified by processors using non transitory computer readable media or computer readable memory.

BRIEF DESCRIPTION OF THE DRAWINGS

FIG. 5A shows an exemplary feature record 500 associated with a feature.

FIG. 5B shows a quantization record 550 associated with each unit of a quantized 3D space.

DETAILED DESCRIPTION

Figure 1:
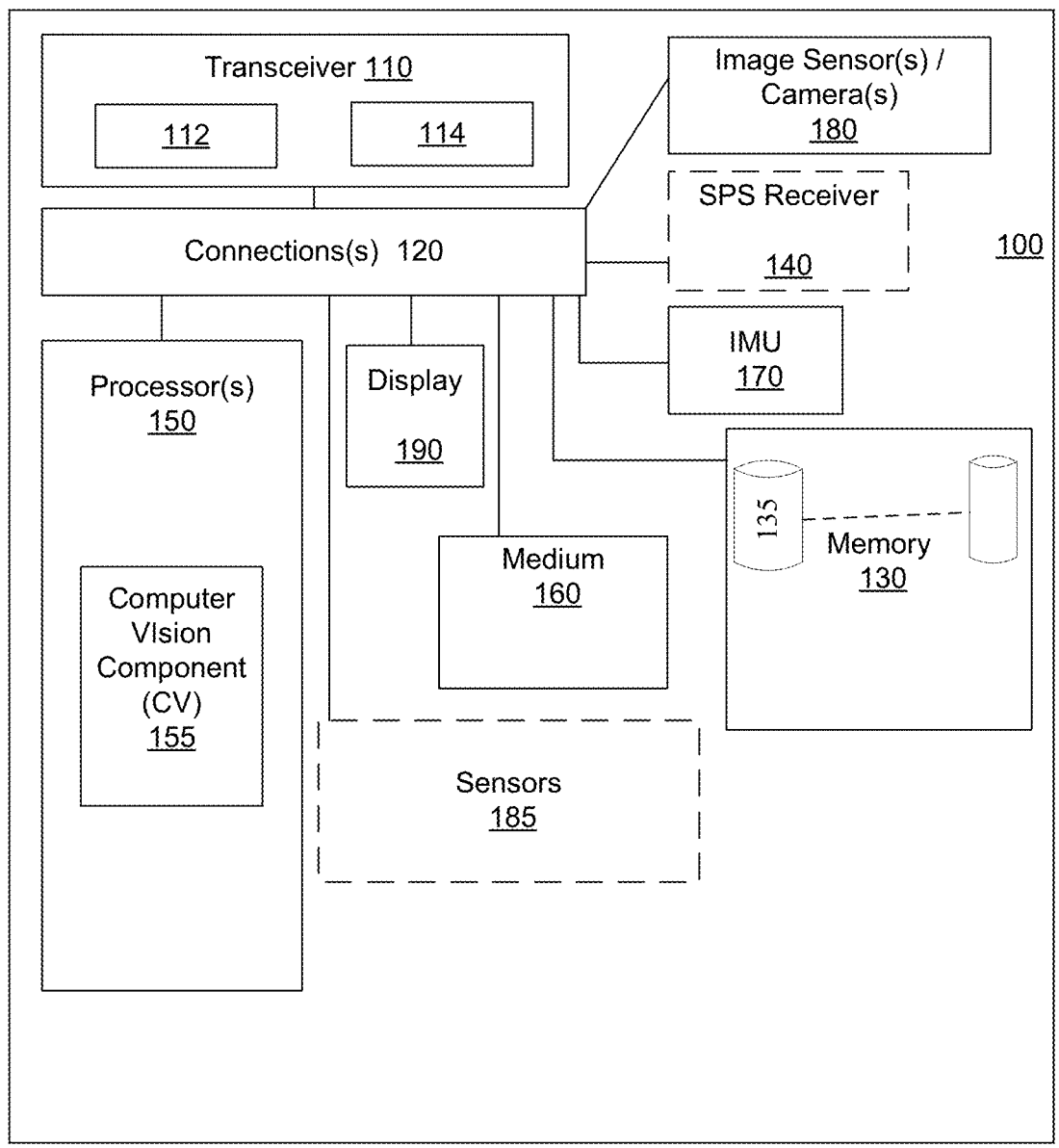
FIG. 1 shows a schematic block diagram illustrating certain exemplary features of an UE enabled to support VNS functions in accordance with disclosed embodiments.

In mapping and/or navigation systems, the term "odometry" refers to the estimation of changes in position over time based on measurements from sensors. In VNS, several visual features may be tracked from frame to frame, which may be used to determine an accurate estimate of relative camera motion. However, VNS' suffer from pose drift, which may accumulate and increase progressively from image frame to image frame unless corrected. Pose drift describes the error between the actual position of the mobile device and the VNS determined position of the mobile device. Pose drift or drift occurs because of residual errors in pose computation for an individual frame and from the accumulation of such errors from frame to frame. One approach to reducing or mitigating pose drift is "loop closure". In loop closure, a mobile device may determine if, after some arbitrary length of time, a currently viewed feature corresponds to some previously viewed feature on its trajectory.

Disclosed embodiments pertain to the determination of loop closure or "relocalization" in VNS. In some embodiments, a VNS may create and/or maintain a 3-Dimensional (3D) map, which may include the 3D position of observed features. Based, in part, on currently observed features in a scene, the VNS may determine a subset of recently observed features. The subset of recently observed features may be matched with prior features observed at some prior time that are spatially or geometrically proximate to the recently observed features. Spatial proximity of features may be determined, for example, based on the 3D map.

For a given image feature, pose drift is typically not affected by inaccuracies in the estimated positions of nearby features that have been observed simultaneously or within some short time interval. Therefore, in some embodiments, a rigid transformation may be used to determine whether a loop closure event has occurred based on the degree of correspondence between a subset of recently observed features with a set of prior features observed at some earlier time. In some embodiments, features may be grouped based on their estimated locations in space. Thus, spatial proximity may be used to facilitate determination of a candidate set of previously observed features for comparison with a subset of recently observed features. In instances where the rigid transformation that maps a set of recent features to their previously observed counterparts is a pure translation, then, in some embodiments, an exhaustive search may be used to prune the candidate set to obtain a set of corresponding features that match the recently observed subset of features. In some embodiments, RAndom SAmple Consensus (RANSAC) based techniques may be used to prune the candidate set. In some embodiments, appearance based feature properties or descriptors may be used additionally and/or in conjunction with the above techniques to prune the set of candidate matches. In some embodiments, various robust estimation techniques, Hough transforms, or similar approached may be used to obtain a set of corresponding features that match the recently observed subset of features. These and other embodiments are described further below in relation to the figures.

The terms "User Device" (UD) or "user equipment" (UE) or are used interchangeably herein and may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND. The UE may represent a mobile telephone, notepad computer or laptop, or it may be a vehicle that collects measurement sets for the purpose providing a real time position and/or map creation.

In addition, the terms UD, UE, "mobile station" "mobile device" or "target" are intended to include all devices, including wireless and wireline communication devices, computers, laptops, etc. which are capable of communication with a server, such as via the Internet, Wi-Fi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "user device."

FIG. 1 shows a schematic block diagram illustrating certain exemplary features of UE 100 enabled to support VNS functions. VNS functions may include one or more of visual navigation, VIO, and/or VBP. In some embodiments, VNS functions may be based on a combination of sensor based measurements, which may include image sensor, camera, or other image based techniques.

UE 100 may, for example, include one or more processors or processor(s) 150, memory 130, a transceiver 110 (e.g., wireless network interface), and image sensors/camera(s) 180 (hereinafter "camera(s) 180"), and/or Inertial Measurement Unit (IMU) 170. In some embodiments, UE 100 may optionally include GNSS or Satellite Positioning System (SPS) receiver 140. In some embodiments, UE 100 may also optionally or additionally include sensors 185, which may comprise one or more of: a magnetometer, an altimeter, a barometer, and various other sensors. In some embodiments, UE 100 may include non-transitory computer-readable medium 160, display 190, and memory 130, which may be operatively coupled to each other with one or more connections 120 (e.g., buses, lines, fibers, links, etc.). In certain example implementations, all or part of UE 100 may take the form of a chipset, and/or the like.

In embodiments where UE 100 includes SPS receiver 140, SPS receiver 140 may be enabled to receive signals associated with one or more SPS resources. Received GNSS/SPS signals may be stored in memory 130 and/or used by processor(s) 150 to determine a position of UE 100. In some embodiments, SPS receiver may include a code phase receiver and a carrier phase receiver, which may measure carrier wave related information. The carrier wave, which typically has a much higher frequency than the pseudo random noise (PRN) (code phase) sequence that it carries, may facilitate more accurate position determination. The term "code phase measurements" refer to measurements using a Coarse Acquisition (C/A) code receiver, which uses the information contained in the PRN sequence to calculate the position of UE 100. The term "carrier phase measurements" refer to measurements using a carrier phase receiver, which uses the carrier signal to calculate positions. The carrier signal may take the form, for example for GPS, of the signal L1 at 1575.42 MHz (which carries both a status message and a pseudo-random code for timing) and the L2 signal at 1227.60 MHz (which carries a more precise military pseudo-random code). In some embodiments, carrier phase measurements may be used to determine position in conjunction with code phase measurements and differential techniques, when GNSS signals that meet quality parameters are available. The use of carrier phase measurements along with differential correction, can yield sub-meter position accuracy. However, even in embodiments where UE 100 is equipped with SPS receiver 140, GNSS measurements may not be available in many situations and UE 100 may alternatively, or additionally, use VNS for positioning, odometry and/or navigation applications.

Transceiver 110 may, for example, include a transmitter 112 enabled to transmit one or more signals over one or more types of wireless communication networks and a receiver 114 to receive one or more signals transmitted over one or more types of wireless communication networks. Wireless communication networks may include, for example, Wireless Wide Area Networks (WWAN), including cellular networks, and/or Wireless Local Area Networks (WLANs).

In some embodiments, UE 100 may comprise optical sensors such as CCD or CMOS sensors and/or camera(s) 180, In some embodiments, optical sensors may include or be coupled to a Light Detection And Ranging (LIDAR) unit/lasers with associated instrumentation including scanners, photo-detectors and receiver electronics. Optical sensors/camera(s) are hereinafter referred to "camera(s) 180". Camera(s) 180 may convert an optical image into an electronic or digital image and may send captured images to processor(s) 150. In some embodiments, camera(s) 180 may be housed separately, and may be operationally coupled to display 190, processor(s) 150 and/or other functional units in UE 100.

In some embodiments, UE 100 may also include Inertial Measurement Unit (IMU) 170. In some embodiments, IMU 170, which may comprise 3-axis accelerometer(s), 3-axis gyroscope(s), and/or magnetometer(s), may provide velocity, orientation, and/or other position related information to processor(s) 150. In some embodiments, IMU 170 may be configured to measure and output measured information synchronized to the capture of each image frame by camera(s) 180, and/or measurements taken by sensors 185 in UE 100. In some embodiments, the output of IMU 170 may be used, in part, by processor(s) 150 to determine a position and orientation of UE 100.

The term "measurement set" is used to refer to signal measurements performed by a UE at a measurement location at a point in time or within some specified interval of a point in time. The signal measurements made may be related to VN, mapping and/or position determination. The signal measurements made may also depend on UE 100, the capabilities of UE 100, environmental characteristics and/or signal characteristics that are available for measurement by UE 100 at a specific location/time. Typically, a measurement set may comprise VIO measurements (e.g. based on captured image(s) or LIDAR measurements), and IMU measurements, where each element of the measurement set may have been recorded within some specified time interval of a point in time. The measurement sets recorded by UE 100 may be stored in memory 130 on UE 100.

Processor(s) 150 may be implemented using a combination of hardware, firmware, and software. In some embodiments, processor(s) 150 include Computer Vision (CV) component 155 (hereinafter "CV 155"), which may implement a variety of image processing, visual navigation and computer vision functions.

In some embodiments, camera(s) 180 may include multiple cameras, front and/or rear facing cameras, wide-angle cameras, and may also incorporate CCD, CMOS, and/or other sensors. Camera(s) 180, which may be still and/or video cameras, may capture a series of 2-Dimensional (2D) still and/or video image frames of an environment and send the captured image frames to processor(s) 150. In some embodiments, camera(s) 180 may be a wearable camera, or an external camera, which may be operationally coupled to, but housed separately from, other functional units in UE 100. In one embodiment, images captured by camera(s) 180 may be in a raw uncompressed format and may be compressed prior to being processed and/or stored in memory 160. In some embodiments, image compression may be performed by processor(s) 150 (e.g. by CV 155) using lossless or lossy compression techniques.

In some embodiments, camera 180 may be a depth sensing camera or may be coupled to depth sensors. The term "depth sensor" is used to refer to functional units that may be used to obtain depth information for an environment independently and/or in conjunction with camera(s) 180. In some embodiments, may comprise RGBD cameras, which may capture per-pixel depth (D) information when the depth sensor is enabled, in addition to color (RGB) images. As another example, in some embodiments, camera 110 may take the form of a 3D Time Of Flight (3DTOF) camera. In embodiments with 3DTOF cameras 110, the depth sensor may take the form of a strobe light coupled to the 3DTOF camera 110, which may illuminate objects in a scene and reflected light may be captured by a CCD/CMOS sensor in camera 110. Depth information may be obtained by measuring the time that the light pulses take to travel to the objects and back to the sensor. In some embodiments, UE 100 may include or be coupled to LIDAR sensors, which may provide measurements to estimate relative displacement of UE 100 between two locations.

As a further example, the depth sensor may take the form of a light source coupled to cameras 110. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. In one embodiment, depth information may be obtained from stereo sensors such as a combination of an infra-red structured light projector and an infra-red camera registered to a RGB camera. In some embodiments, camera(s) 180 may be stereoscopic cameras capable of capturing 3 Dimensional (3D) images. In another embodiment, camera(s) 180 may include depth sensors that are capable of estimating depth information. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information. In some embodiments, depth sensors may be disabled, when not in use. For example, the depth sensor may be placed in a standby mode, or powered off when not being used. In some embodiments, processors 150 may disable (or enable) depth sensing at one or more points in time.

Processor(s) 150 may also execute software to process image frames captured by camera(s) 180. For example, processor(s) 150 and/or CV 155 may be capable of processing one or more image frames received from camera(s) 180 to determine the pose of camera(s) 180 and/or UE 100, implementing various computer vision and image processing algorithms and/or performing VIO based on the images received from camera(s) 180. The pose of camera(s) 180 refers to the position and orientation of the camera(s) 180 relative to a frame of reference. In some embodiments, camera pose may be determined for 6-Degrees Of Freedom (6-DOF), which refers to three translation components (which may be given by X,Y,Z coordinates of a frame of reference) and three angular components (e.g. roll, pitch and yaw relative to the same frame of reference).

In some embodiments, the 6-DOF pose of camera(s) 180 and/or UE 100 may be determined and/or tracked by processor(s) 150 using a visual tracking solution based on image frames captured by camera(s) 180. In some embodiments, processor(s) 150 and/or CV 155 may be implemented using dedicated circuitry, such as Application Specific Integrated Circuits (ASICs), Digital Signal Processors (DSPs), and/or dedicated processor.

In some embodiments, CV 155 may implement various computer vision and/or image processing methods such as 3D reconstruction, image compression and filtering. In some embodiments, CV 155 may be perform visual navigation, VIO, vision based positioning, etc. In some embodiments, the methods implemented by CV 155 may be based on color or grayscale image data captured by camera(s) 180, which may be used to generate estimates of 6-DOF pose measurements of the camera.

In some embodiments, CV 155 and/or processor(s) 150 may identify visually conspicuous points or salient features (hereinafter "features") in 3-dimensions (3D). The features may include keypoints or interest points, corner points, edges, image patches and/or feature descriptors in a captured image frames, which may be tracked in a subsequent image frames. In some embodiments, salient image features may be represented using descriptors, which may take the form of Scale Invariant Feature Transform (SIFT), Speeded-Up Robust Descriptors (SURF), Features from Accelerated Segment Test (FAST) etc., which are well-known in the art. In some embodiments, the salient image features may be stored in memory 130 along with geometric information, which may include an estimated 3D position of each stored salient image feature. In some embodiments, each feature may be timestamped with the time that it was first observed. In some embodiments, the stored image descriptors and the corresponding geometric information associated with each feature may be utilized at a later point by an image or object detector to determine and/or update the pose of a UE. CV 155 may also implement computer vision based feature tracking and matching in addition to geometric or spatial feature matching manner consistent with disclosed embodiments.

Figure 2A:
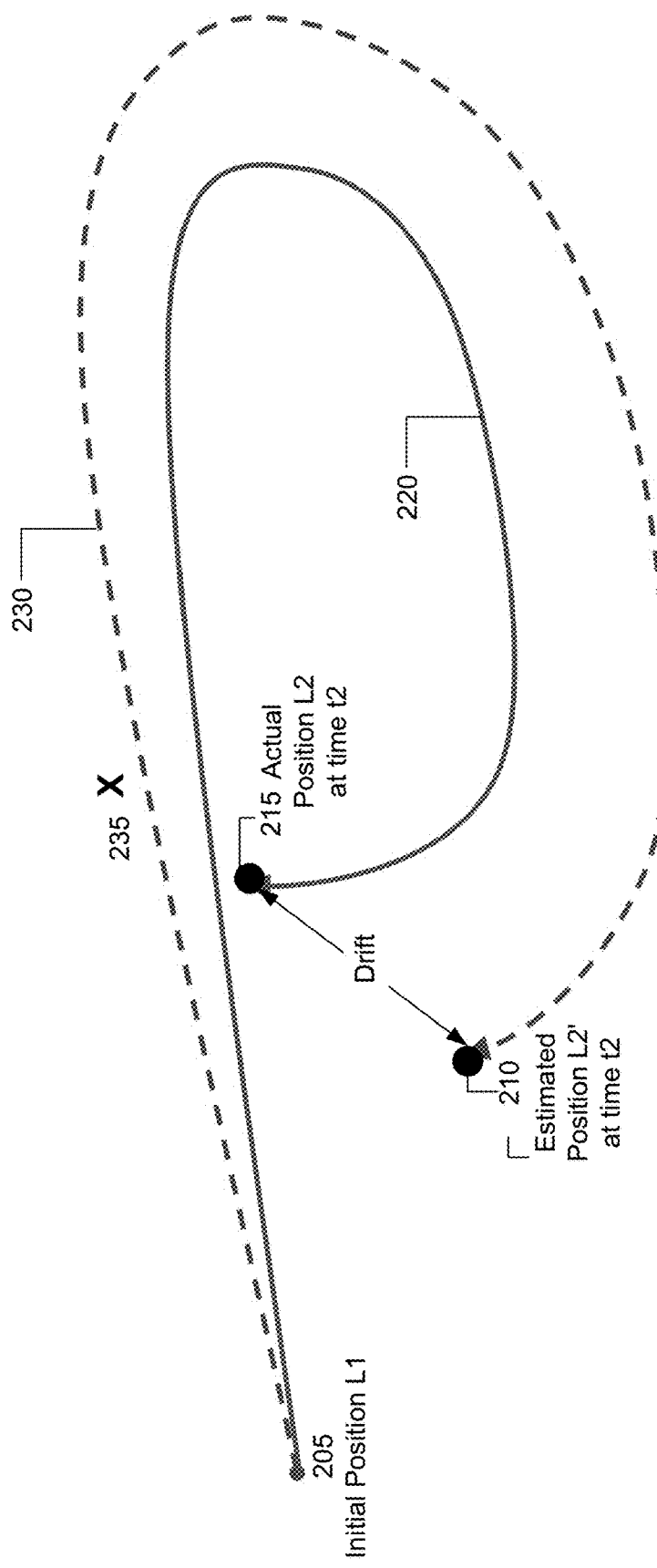
FIG. 2A shows an actual trajectory and an estimated trajectory (shown by the dashed line) of UE 100 starting at position L1.

In some embodiments, processor(s) 150 may be used to perform relocalization, for example, by detecting "loop closure". Loop closure is illustrated in FIG. 2A, which shows an actual trajectory 220 of UE 100 starting at position L1 205 and an estimated trajectory 230 (shown by the dashed line) of UE 100. As the UE travels along trajectory 220, UE 100 may estimate its position using VIO based, in part, on a plurality of feature points n images, such as, for example, feature points associated with some object X 235. However, VIO suffers from drift. Thus, as drift errors accumulate, estimated trajectory 230 diverges from actual trajectory 220. Thus, when UE 100 is at location L2, there is a divergence between the actual pose of UE 100 and the estimated pose of UE 100, which is termed drift. In FIG. 2A, the drift 240 at time t2 is the difference between the estimated position L2' 210 and actual position L2 215. Since drift accumulates with time, to minimize drift, in some embodiment, processor(s) 150 may perform loop closure or relocalization periodically by correcting drift based on previously observed features.

For example, relocalization may used to determine that object X 235 has been previously observed. The previously estimated location of object X and the pose of UE 100 associated with the previous observation may be used to correct drift 240 and the estimated position L2' 210 of UE 100 at time t2. While conventional relocalization is based on visual feature matching, the use of purely visual techniques for relocalization can be computationally expensive. In addition, because features may appear different from different viewpoints, relocalization based solely on appearance based techniques can sometimes yield inaccurate results.

In some embodiments, processor(s) 150 and/or CV 155 may determine: (i) an ordered sequence of camera positions, (ii) a plurality of features associated with each camera position, and (iii) a corresponding 3D position of each of the plurality of features for the camera position. In some embodiments, the features along with the geometric information associated with each feature, which may include the 3D location of the feature, may be stored in databases, tables, and the like, and used to build one or more maps of the environment. In some embodiments, the maps may be built in real time as UE 100 moves within the environment.

In some embodiments, the maps may include a first map termed a "local map", which may include features currently visible to camera(s) 180 and covisible features. The term "covisible" relative to a first feature refers to those features that are visible from camera poses where the first feature is also visible. In some embodiments, for each feature in the current image frame, a set of corresponding co-visible features may be determined. For a feature $f_i$ in the local map, the corresponding set of co-visible features $C_i$ is determined as those features visible from all prior camera poses, from which the feature $f_i$ is also visible. The local feature map (M) then may be written as M=F∪C, where F={$f_i$|i=1, 2 . . . n} is the set of n currently visible features, and C=$C_1$∪$C_2$∪ . . . ∪$C_n$ is the corresponding set of covisible features. C may be obtained as the union of sets $C_i$ of covisible features corresponding to local features $f_i$.

In some embodiments, the maps may further include a second map termed a "prior map" S, which may include every feature seen from camera poses at times earlier than the earliest viewpoint from which a feature in M is seen.

Because features $f_i$∈F in a current frame may be tracked over some sequence of frames, the corresponding sets $C_i$ of covisible features for each $f_i$ may be obtained based on the features visible in the current frame and features that may be present in one or more the prior sequence of frames. For example, an algorithm may record the time and/or frame that a feature $f_i$∈F is first seen and build a set of covisible features for that frame. Additional covisible features may be added as the feature is viewed in subsequent frames to obtain the set $C_i$. In some embodiments, relocalization may be performed to determine that some feature $f_j$ that appears in a subsequent discontiguous frame corresponds to a feature $f_i$ that has previously appeared. In some embodiments, until relocalization establishes a correspondence, feature $f_j$ may be treated as a distinct feature from feature $f_i$.

Figure 2B:
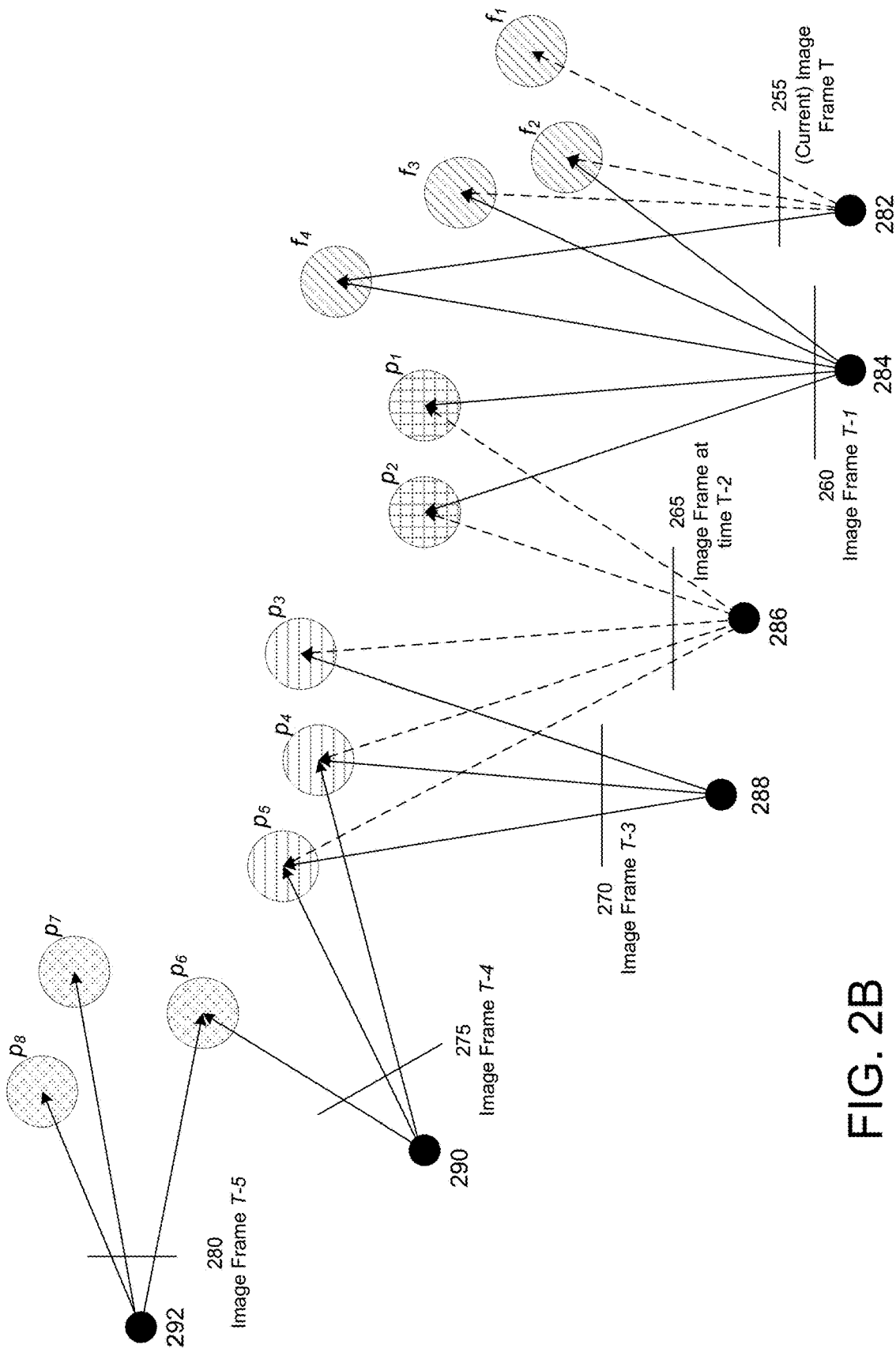
FIG. 2B shows feature points visible in a sequence of image frames captured at various camera positions.

FIG. 2B shows feature points visible in a sequence of image frames captured at various camera positions. FIG. 2B illustrates a corresponding local feature map $M_T$ and a portion of a prior map $S_T$ for exemplary current image frame T 255 at camera pose 282.

As shown in FIG. 2B, local feature set $F_T$={$f_1$, $f_2$, $f_3$, $f_4$} where $f_1$, $f_2$, $f_3$, and $f_4$ are features visible in current image frame T 255 at camera pose 282. As shown in FIG. 2B, features $f_2$, $f_3$, and $f_4$ are also visible in image frame T-1 260 along with features $p_1$ and $p_2$ at camera pose 284. Thus, features $f_2$, $f_3$, and $f_4$ and features $p_1$ and $p_2$ are covisible features. Further, as shown in FIG. 2B, none of features $f_1$, $f_2$, $f_3$, or $f_4$ (visible in current image frame T 255) are visible in image frames T-2 265, T-3 270, T-4 275, or T-5 280 at camera poses 286, 288, 290 and 292, respectively. Therefore, for image frame T 255 at camera position 282, the corresponding local feature map is given by $M_T$={$f_1$, $f_2$, $f_3$, $f_4$, $p_1$, $p_2$}.

Further, as shown in FIG. 2B, in image frame T-2 265 at camera position 286, features $p_1$ and $p_2$ (which are in local feature map $M_T$) are visible along with features $p_3$, $p_4$, and $p_5$. Features $p_3$, $p_4$, and $p_5$ are not in the local map because they are not visible in image frame T 255 or in an image frame where at least one of features $f_1$, $f_2$, $f_3$, or $f_4$ is visible.

Similarly, in image frame T-3 270 at camera position 288, features $p_3$, $p_4$, and $p_5$ are visible. Features $p_3$, $p_4$, and $p_5$ are not in the local map because they not visible in image frame T 255 or in an image frame where at least one of features $f_1$, $f_2$, $f_3$, or $f_4$ is visible.

In image frame T-4 275 at camera position 290, features $p_4$, $p_5$, and $p_6$ are visible. Features $p_4$, $p_5$, and $p_6$ are not in the local map because they are not visible in image frame T 255 or in an image frame where at least one of features $f_1$, $f_2$, $f_3$, or $f_4$ is visible.

In FIG. 2B, features $p_3$, $p_4$, and $p_5$ are also not in the prior map $S_T$ because they are seen at pose 286 in frame T-2 along with features $p_1$ and $p_2$, which are in local feature map $M_T$. As outlined above, prior map $S_T$ includes features seen from camera poses at times earlier than the earliest viewpoint from which a feature in $M_T$ is seen. Thus, features $p_3$, $p_4$, and $p_5$ seen in image frames T-3 270 and T-4 275 at poses 288 and 290 are neither in the local map $M_T$ (because they are not visible in image frame T 255 or in an image frame where at least one of features $f_1$, $f_2$, $f_3$, or $f_4$ is visible), nor in the prior map (because they are seen at pose 286 in image frame T-2 with features $p_1$ and $p_2$ in $M_T$). Features $p_3$, $p_4$, and $p_5$ may, for example, be part of a third map, which may be a global map G that includes all the features seen up to the current time. Global map G may thus includes features in local feature map M, prior map S, and other features that are neither in local feature map M nor in prior map S.

In FIG. 2B, feature $p_6$ seen in image frames T-4 275 and T-5 280 at poses 290 and 292, respectively, and features $p_7$ and $p_8$ seen in image frame T-5 280 at pose 292 are in prior map $S_T$ because they are seen at a time earlier than the earliest time in which a feature in $M_T$ is seen. In some embodiments, features in image frames prior to image frame T-5 280 may also be part of prior map $S_T$. In some embodiments, each feature in the local feature map $M_T$ and global prior map $S_T$ may be associated with a corresponding 3D position. In some embodiments, the 3D position corresponding to a feature may be determined and stored, for example, based on the camera pose at the time the feature is first observed. Further, in some embodiments, the determined and/or stored 3D locations of one or more features may be corrected or updated following loop closure.

In some embodiments, features or feature points may be indexed based on their location in one or more of local feature map M, prior map S, and/or global 3D map G. For example, global 3D map G may be quantized and the 3D space being surveyed by UE 100 may be comprised of quantization units. In some embodiments, the quantization units may take the form of cubes, so that the 3D space being surveyed may be viewed as a plurality of cubes. In some embodiments, observed features may be indexed based on the cube that they are located in and/or one or more neighboring cubes. For example, a feature may be indexed with more than one cube when a feature lies near a boundary between cubes, or based on the uncertainty associated with the location of a feature.

Thus, when a feature is observed, its location may be determined and the feature may be added to maps of the environment and an uncertainty associated with the location of the feature may be used to determine one or more cubes in which the feature may be located. The feature may be associated with keys corresponding to cube identifiers. Conversely, in some embodiments, each cube may be associated with one or more feature identifiers. So given a feature, the cubes where the feature may be located can be obtained and conversely, given a cube, the features located in that cube may be determined.

Tracking the pose of UE 100 and/or camera(s) 180 in a spatial coordinate system can be accomplished in a variety of ways. In some embodiments, tracking can be done using VIO based tracking, which, in some embodiments, may use a combination of visual and inertial tracking systems. For example, images captured by camera(s) 180 may be used in conjunction with measurements by IMU 170 and/or sensors in sensor bank 185 (e.g. altimeter, barometer, magnetometer etc.) to determine the pose of UE 100 and/or camera(s) 180. In another embodiment, depth data from a depth sensor, which may be captured in conjunction with the capture of a depth-image by camera(s) 180, may be used, in part, to compute camera pose In some embodiments, VIO based techniques may be used, in part, to correct for errors (such as biases and drift) in IMU 170. In some embodiments, when available, GNSS coordinates may also be used to provide 3D location information.

In some embodiments, the pose of the camera may be used to recalibrate sensors in IMU 170, and/or to compensate for and/or remove biases from measurements of sensors 185 and/or sensors in IMU 170. For example, IMU 170 and/or sensors 185 may output measured information in synchronization with the capture of each image frame by camera(s) 180 by UE 100. When the camera pose can be estimated accurately, for example, based on the images (e.g. successful detection of one or more corresponding feature points in images) then the VIO estimated camera pose may be used to apply corrections to measurements by IMU 170 and/or sensors 185 and/or to recalibrate IMU 170/sensors 185, so that measurements by IMU 170/sensors 185 may more closely track the VIO determined pose.

The methodologies described herein may be implemented by various means depending upon the application. For example, these methodologies may be implemented using modules in hardware, firmware, software, or any combination thereof. For a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using code, procedures, functions, and so on that perform the functions described herein. Any machine-readable medium tangibly embodying instructions may be used in implementing the methodologies described herein. For example, software codes may be stored in a non-transitory computer-readable medium 160 or memory 130 that is connected to and executed by processor(s) 150. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates computer vision, VNS, image processing, and other tasks performed by CV 155 on processor(s) 150. For example, memory 160 may hold data, local and global maps, captured still images, depth information, video frames, program results, as well as data provided by IMU 170 and sensors 185.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support VNS.

Computer-readable media 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 160, instructions and/or data may be provided as signals on transmission media included in a communication apparatus. For example, a communication apparatus may include a transceiver 110, which may receive signals through receiver 112 indicative of instructions and data. The instructions and data may cause one or more processors to implement VNS and/or other functions outlined herein. That is, the communication apparatus includes transmission media with signals indicative of information to perform disclosed functions.

Memory 130 may represent any data storage mechanism. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions 1108 stored thereon, which if executed by at least one processor(s) 150 may be operatively enabled to perform all or portions of the example operations as described herein. Computer readable medium 160 may be a part of memory 130.

Further, UE 100 may include a screen or display 190 capable of rendering color images, including 3D images. In some embodiments, display 190 may be used to display live images captured by camera(s) 180, Graphical User Interfaces (GUIs), program output, etc. In some embodiments, display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 190 may be implemented using a Liquid Crystal Display (LCD) display or a Light Emitting Diode (LED) display, such as an Organic LED (OLED)

display. In other embodiments, display 190 may be housed separately and may be operationally coupled to camera 180, processor(s) 150, and/or other functional units in UE 100.

In some embodiments, processor(s) 150 may also receive input from one or more sensors in sensor bank 185 (also referred to as "sensors 185"), which may include, for example, a magnetometer, altimeter and/or barometer. The magnetometer may be capable of measuring the intensity and/or the direction of the Earth's magnetic field and may serve as a compass and/or provide an indication of a direction of travel of UE 100. The altimeter may be used to provide an indication of altitude above a calibrated level, while the barometer may provide an indication of atmospheric pressure, which may also be used to obtain a determination of altitude.

In some embodiments, sensors 185 may include one or more of an ambient light sensor, acoustic transducers such as microphones/speakers, ultrasonic transducers and/or depth sensors, which may be used to acquire depth information and/or determine distance to a target. In general, the list of sensors above in not exhaustive and sensor bank 185 may include various other types of sensors and transducers which are increasingly being incorporated into user devices such as vehicle mounted devices, smartphones, and other mobile devices. In some embodiments, UE 100 may not include one or more sensors in sensor bank 185. For example, one or more of an altimeter, barometer, and/or magnetometer may be omitted.

Figure 3:
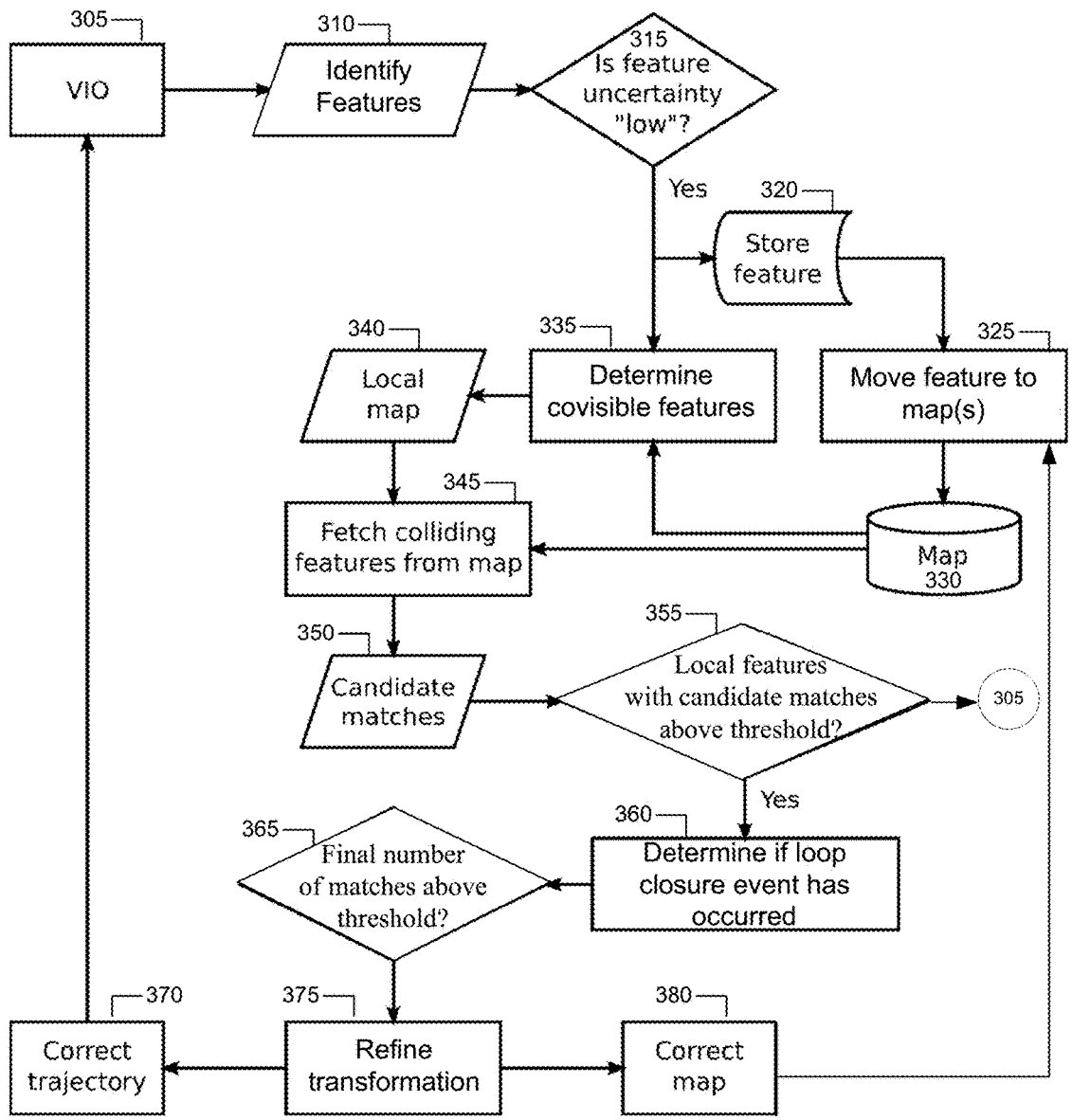
FIG. 3 shows a flowchart of an exemplary method 300 for relocalization based, in part, on geometric information, in a manner consistent with disclosed embodiments.

FIG. 3 shows a flowchart of an exemplary method 300 for relocalization based, in part, on geometric information, in a manner consistent with disclosed embodiments. In some embodiments, method 300 may be performed by one or more of UE 100 and/or processor(s) 150 and/or CV 155.

In some embodiments, in block 310, features may be identified in a current image frame, which may be captured by camera(s) 180. Features may be keypoints, corner points, points of interest, or any other salient features in the current image frame. In some embodiments, when a feature is first viewed, the feature may be timestamped.

In block 315, in some embodiments, the identified features may be pruned based on a feature uncertainty measure. Features with low position uncertainty may be selected for addition to the 3D maps. For example, low position uncertainty features may be added to a local 3D feature map, prior map, and/or global map. As one example, for an augmented reality application, "low position uncertainty" may imply that the square root of the trace of the covariance matrix of the estimated position of a 3D feature is under a millimeter. As another example, for an outdoor-navigation low position uncertainty may imply that the square root of the trace of the covariance matrix of the estimated position of a 3D feature is of the order of a few centimeters. In general, the determination of what constitutes "low position uncertainty" may be application dependent.

In block 320, selected features may be stored in a map database. For example, when a feature is observed and/or selected, its location may be determined and the feature may be added to maps of the environment. For example, the feature may be added to one or more of local feature map M, prior map S, and/or global map G.

In some embodiments, the features may be associated with a 3D location. For example, a feature database may index each feature by its location and conversely, a location database may index a location or a region around the location with features corresponding to the location. In some embodiments, features may be timestamped with the time that they are first observed.

In some embodiments, the environment may quantized by dividing the volume into quantization units. In some embodiments, the quantization units may take the form of cubes and each feature may be indexed by one or more cubes. Conversely, each cube may be indexed by features lying within the cube. For example, an uncertainty associated with the location of a feature may be used to determine one or more cubes in which the feature may be located. The feature may be associated with keys corresponding to cube identifiers. Conversely, in some embodiments, each cube may be associated with one or more feature identifiers. So given a feature, the cubes where the feature may be located can be obtained and conversely, given a cube, the features located in that cube may be determined.

Figure 4:
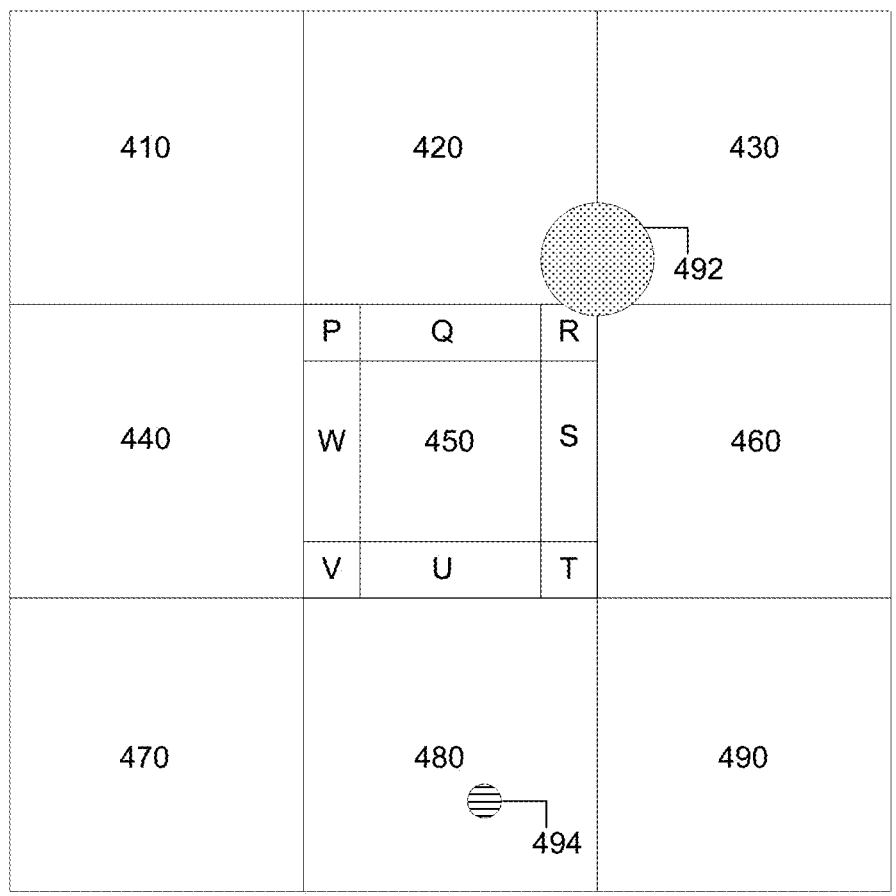
FIG. 4 shows a schematic representation of an exemplary quantization of a 3D volume 400 obtained by dividing 3D volume 400 into cubes.

FIG. 4 shows a schematic representation of an exemplary quantization of a 3D volume 400 obtained by dividing 3D volume 400 into cubes. As shown in FIG. 4, 3D volume 400 comprises cubes 410, 420, 430, 440, 450, 460, 470, 480, and 490. As shown in FIG. 4B, cube 450 may be subdivided into regions P, Q, R, S, T, U, V, and W where: region P is associated with cubes (410, 420, 440, 450); region Q associated with cubes (420, 450); region R is associated with cubes (420, 430, 450, 460); region S is associated with cubes (450, 460); region T is associated with cubes (450, 460, 480, 490); region U is associated with cubes (450, 480); region V is associated with cubes (440, 450, 470, 480); and region W is associated with cubes (440, 450).

Thus, feature 492, which may be located in the region shown by the circle may be associated with cubes 420, 430 and 460 in a map database. Further, as shown in FIG. 4, feature 494 may be associated with cube 480 in a map database. For example, a database lookup of a record associated with feature 492 will yield cubes 420, 430 and 460. Similarly, a database lookup of a record associated with feature 494 will yield cube 480. Conversely, a database lookup of a record associated with cubes 420, 430, and 460 will yield feature 492, while a database lookup of a record associated with feature 494 will yield cube 480.

Referring to FIG. 3, in some embodiments, in block 325, the selected features may be associated with one or more maps. For example, the selected features may be added to global map G and/or local map M. In some embodiments, a record for a feature may be associated with covisible features. For example, when several features $f_i$ are visible in a single image frame, each feature $f_i$, i=1 . . . n may be associated with every other visible feature $f_j$, i≠j for that frame as a feature covisible with feature $f_i$.

In block 335, covisible features may be determined for features on local map 340. For example, referring to FIG. 2B, for image frame T 255 with visible features $f_1$, $f_2$, $f_3$, and $f_4$, covisible features $p_1$ and $p_2$ may be determined. In some embodiments, for an image frame, where F={$f_i$|i=1, 2 . . . n} is the set of features visible in that frame, then, each feature $f_i$, i=1 . . . n may be associated with every other visible feature $f_j$, i≠j for that frame as a feature covisible with feature $f_i$. Thus, for any given frame with visible features, in block 335, the set of covisible features may be determined by looking up database record of each feature visible in that frame. The set of covisible features C=$C_1 \cup C_2 \cup$ . . . $\cup C_n$ may be determined as the union of sets $C_i$ of covisible features corresponding to local features $f_i$ as outlined above.

In block 340, the local map may be determined. In some embodiments, as outlined above, the local feature map may be determined as M=F∪C. For example, referring to FIG. 2B, the local feature map for image frame T 255 may be determined as $M_T$={$f_1$, $f_2$, $f_3$, $f_4$, $p_1$, $p_2$}.

Thus, features $f_2$, $f_3$, and $f_4$ and features $p_1$ and $p_2$ are covisible features. Further, as shown in FIG. 2B, none of features $f_1$, $f_2$, $f_3$, or $f_4$ (visible in current image frame T 255) are visible in image frames T-2 265, T-3 270, T-4 275, or T-5 280 at camera poses 282, 284, 286, 288, 290 and 292, respectively. Therefore, for image frame T 255 at camera position 282, the corresponding local feature map is given by $M_T = \{f_1, f_2, f_3, f_4, p_1, p_2\}$.

FIG. 5A shows an exemplary feature record 500 associated with a feature. In some embodiments, each feature may be identified by a feature identifier 510, a 3D location of the feature 515, and a 3D location uncertainty 520. In some embodiments, feature record may further include identifiers or locations of one or more cubes (or another quantization of 3D space) in which the feature may be located based on 3D location 515 and/or 3D location uncertainty 520.

Feature record 500 may also include a list of covisible features 530 (if any) and time first seen 535, which indicates the time that the feature was first observed. The list of covisible features corresponding to a feature may be updated periodically, or for each image frame, or at some predetermined frame interval.

FIG. 5B shows a quantization record 550 associated with each unit of a quantized 3D space. Quantization record 550 may include cube identifier 555, 3D range 360 associated with the cube, neighboring cubes 565, and associated features 570 representing features that are estimated to lie within the cube. In some embodiments, for a feature $f_i$ at a location $(X_i, Y_i, Z_i)$ that is added to the map, the key or cube identifier may be computed as $$C_i = \left(\frac{X_i}{s}, \frac{Y_i}{s}, \frac{Z_i}{s}\right),$$

where s is the map scale. In some embodiments, hash tables may be used to store feature record 500 and/or quantization record 550. Thus, in the embodiment above, collisions in the hash table are related spatial proximity: larger scales s will produce more collisions in the table. The map scale can also be interpreted as a bin or cube size in the quantification of the 3D space where the 3D features reside. Features located within the same bin or cube or within some threshold distance (e.g. less than some number q cubes apart) may be considered proximate.

In some embodiments, quantization record may be used to facilitate proximity queries. For example, based on 3D location 515 of a feature, associated cubes 525 associated with the feature may be determined using feature record 500. Quantization record 550 may be looked up using cubes 525 associated with the feature to determine proximate features 570 located within the same cube (and/or neighboring cubes).

In block 345, based on the current pose of UE 100 and/or camera(s) 180, and/or the locations of features in local feature map M, a set of prior features S may be determined. For example, prior map S, may include every feature within some threshold distance of current camera position and seen from camera poses at times earlier than the earliest viewpoint from which a feature in M is seen.

In some embodiments, in block 345, based on the current pose of UE 100 and/or camera(s) 180, and/or the locations of features in local feature map M, a set of previously observed features within some threshold distance of the observed features is determined. In some embodiments, cubes 525 associated with the features in M may be determined and previously observed features in S within the same cube and/or neighboring cubes may be determined. For example, if the features in M were stored in a hash table, colliding features may be determined based on the hash keys or cube identifiers 555 of the features in M. In some embodiments, the prior map S, which may be determined based on the colliding features, represents the set of candidate matches 350.

In block 355, if the number of local features that match features in the set of candidate matches 350 is above a threshold number ("Y" in block 355), then, in block 360, in some embodiments, a determination of whether a loop closure event has occurred may be performed. In some embodiments, a transformation $\tau$ that maximizes the number of feature matches between M and S may be determined. For example, an optimal transformation $\tau$ may associate a plurality of features f in the local map with corresponding candidate features p in the prior map. In some embodiments, RANSAC (RANdom SAmple Consensus) based techniques may be used to determine $\tau$. In some embodiments, when RANSAC is used, the number of votes of the winning transformation may be compared to an expected number of votes for the null hypothesis that no appropriate transformation exists for features in current local map M before declaring that a loop closure event has occurred. In some embodiments, the determination of a loop closure event may be used for relocalization and/or to correct VIO drift errors and/or to recalibrate the VIO system. In some embodiments, robust estimation, Hough transforms, or similar techniques may be used to determine transformation $\tau$.

In instances where the motion of UE 100 is primarily translation (or where pose drift is primarily translational in nature as in many VIO applications) the transformation to determine matches between M and S may be based on a translation or rigid motion model. In some embodiments, in the example above, where the motion of UE 100 is primarily translation, an exhaustive search for an optimal translation $\tau$ may be performed.

In some embodiments, in block 355, if the number of local features that match features in the set of candidate matches 350 does not exceed a threshold number ("N" in block 355), then, step 305 is invoked and another iteration is begun.

In block 365, if the final number of matches is above a threshold ("Y"), then, in some embodiments, in block 375, the transformation $\tau$ may be refined. In some embodiments, visual matching techniques may be used to determine features in M and S that match visually e.g. based on image descriptors. In some embodiments, based on the features that match visually, the transformation $\tau$ may be redetermined and/or refined. In some embodiments, the pose of UE 100/camera(s) 180 may be redetermined based on the transformation $\tau$.

In step 370, the trajectory of UE 100 may be corrected based on the redetermined pose of UE 100/camera(s) 180. Further, in step 380, the 3D locations of features in the local map M and global map G may be corrected based on the redetermined pose of UE 100/camera(s) 180. In some embodiments, another iteration may be commenced in block 305.

Figure 6:
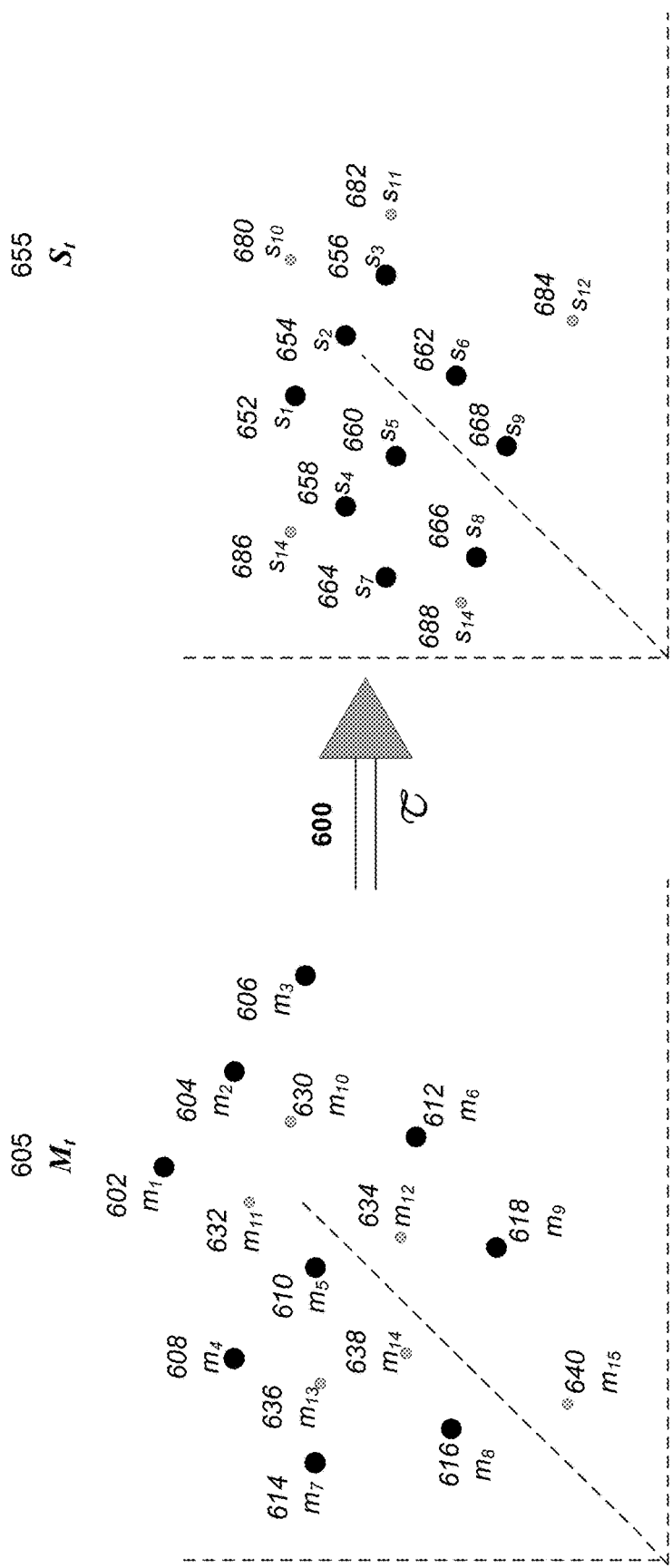
FIG. 6 illustrates a transformation 600 from a subset of local features in first map to a second subset of prior features in a second map.

FIG. 6 illustrates a transformation $\tau$ 600 from a subset of local features in first map $M_t$ 605 to a second subset of prior features in a second map $S_t$ 655. In some embodiments, local features $m_i$ in first map $M_t$ 605 may include visible features in an image frame $I_t$ and a set of covisible features corresponding to the visible features in $I_t$. First map $M_t$ 605 may further include the 3D locations corresponding to local features $m_i$.

Further, as shown in FIG. 6, second map $S_t$ 655 may include prior features $s_j$ and 3D locations corresponding to the prior features, where: (a) each prior feature was first imaged at a time prior to the first imaging of any of the local features in $M_t$ 605, and (b) each prior feature $s_j$ is within a threshold distance of at least one local feature $m_i$.

In some embodiments, based on a comparison of the first map $M_t$ 605 to the second map $S_t$ 655, a first subset comprising previously imaged local features in the first map $M_t$ 605 and a corresponding second subset of prior features in the second map $S_t$ 655 may be determined, each local feature in the first subset corresponds to a distinct prior feature in the second subset. For example, the first subset may be given by the points $\{m_1$ 602, $m_2$ 604, $m_3$ 606, $m_4$ 608, $m_5$ 610, $m_6$ 612, $m_7$ 614, $m_8$ 616, $m_9$ 618$\}$ and the corresponding second subset may be determined as including the points shown as $\{s_1$ 652, $s_2$ 654, $s_3$ 656, $s_4$ 658, $s_5$ 660, $s_6$ 662, $s_7$ 664, $s_8$ 666, $s_9$ 668$\}$, where point $m_i$, i=1 ... 9 corresponds to point $s_i$, i=1 ... 9.

As shown in FIG. 6, the first map $M_t$ 605 may also comprise other features $m_{10}$ 630, $m_{11}$ 632, $m_{12}$ 634, $m_{13}$ 636, $m_{14}$ 638, and $m_{15}$ 640, (not in the first subset) which may not be associated with features in the second map $S_t$ 655. Conversely, the second map $S_t$ 655 may also include features $s_{10}$ 680, $s_{11}$ 682, $s_{12}$ 684, $s_{13}$ 686, and $s_{14}$ 688, which remain unassociated and are not in the second subset.

In some embodiments, a transformation $\tau$ 600 may be determined that maps the first subset of local features in first map $M_t$ 605 to the corresponding second subset of prior features in the second map $S_t$ 605. Because of drift related errors, the position of points in the first subset may differ from the positions of corresponding points in the second subset. However, as outlined above, pose drift is typically not affected by inaccuracies in the estimated positions of nearby features that have been observed simultaneously or within some short time interval. In other words, a correspondence (within some error margin) may be established between a spatial arrangement of some (the first subset) local features to the spatial arrangement of some (the corresponding second subset) prior features.

In some embodiments, loop closure may be determined by determining that some predetermined portion of the local map corresponds to features previously observed and therefore present in the prior map. Due to the presence of drift or errors in the positions of the cameras and 3D coordinates of features, the 3D coordinates of local features and in the local map may not be identical to corresponding 3D coordinates of previously observed features in the prior map. However, once a threshold number of correspondences between the 3D locations of features in the local map and 3D location of features in the prior map is determined, a transformation may be determined to map the features from the former set onto the latter. The transformation may be viewed as mapping a first subset of features in the local map to a second subset of features in the prior map. When the transformation is applied to correct the camera pose, the transformation may reduce the drift (relative to the camera positions at points where the observations of the features in the prior map were made) in the current estimate of the camera pose. The transformation may also be used to correct a trajectory of the UE. In embodiments, where RANSAC or other voting schemes are used to determine the transformation $\tau$ 600 the number of votes for the winning transformation may be compared to the expected number of votes for a null hypothesis, where the null hypothesis represents the postulate that there is no such transformation. In some embodiments, where UE 100 maintains accurate estimates of camera attitude (e.g. roll, pitch, yaw), transformation $\tau$ 600 may be a translation.

The term "spatial arrangement" is used to refer to the pattern of spatial distribution of a set of feature points. The "spatial arrangement" reflects the positions of the feature points relative to one another. The "spatial arrangement" of a set of features is invariant with respect to the pose and location of a camera or cameras that observe such features, even though their appearance of the features in the image or images acquired by these cameras may depend on the pose and location of the cameras. Two sets of features with the same spatial arrangement can be put into a one-to-one correspondence with each other through the application of transformation $\tau$ 600.

For example, as shown in FIG. 6, the spatial arrangement of local features $\{m_1$ 602, $m_2$ 604, $m_3$ 606, $m_4$ 608, $m_5$ 610, $m_6$ 612, $m_7$ 614, $m_8$ 616, $m_9$ 618$\}$, which may form the first subset, may correspond to the spatial arrangement of prior features $\{s_1$ 652, $s_2$ 654, $s_3$ 656, $s_4$ 658, $s_5$ 660, $s_6$ 662, $s_7$ 664, $s_8$ 666, $s_9$ 668$\}$, which may form the corresponding second subset). Therefore, in some embodiments, a transformation $\tau$ 600, which may be a rigid transformation, may be determined to map features in the first subset to features in the corresponding second subset. In some embodiments, a determination of whether a loop closure event has occurred may be made based on the degree of correspondence between the local features in the first subset and the prior features in the second subset. In some embodiments, the spatial arrangement associated with the plurality of the local features in the first map may be determined, based, in part, on the corresponding 3D locations of the plurality of the local features. Further, the spatial arrangement associated with the plurality of the prior features in the second map is determined, based, in part, on the corresponding 3D locations of the plurality of the prior features.

Figure 7:
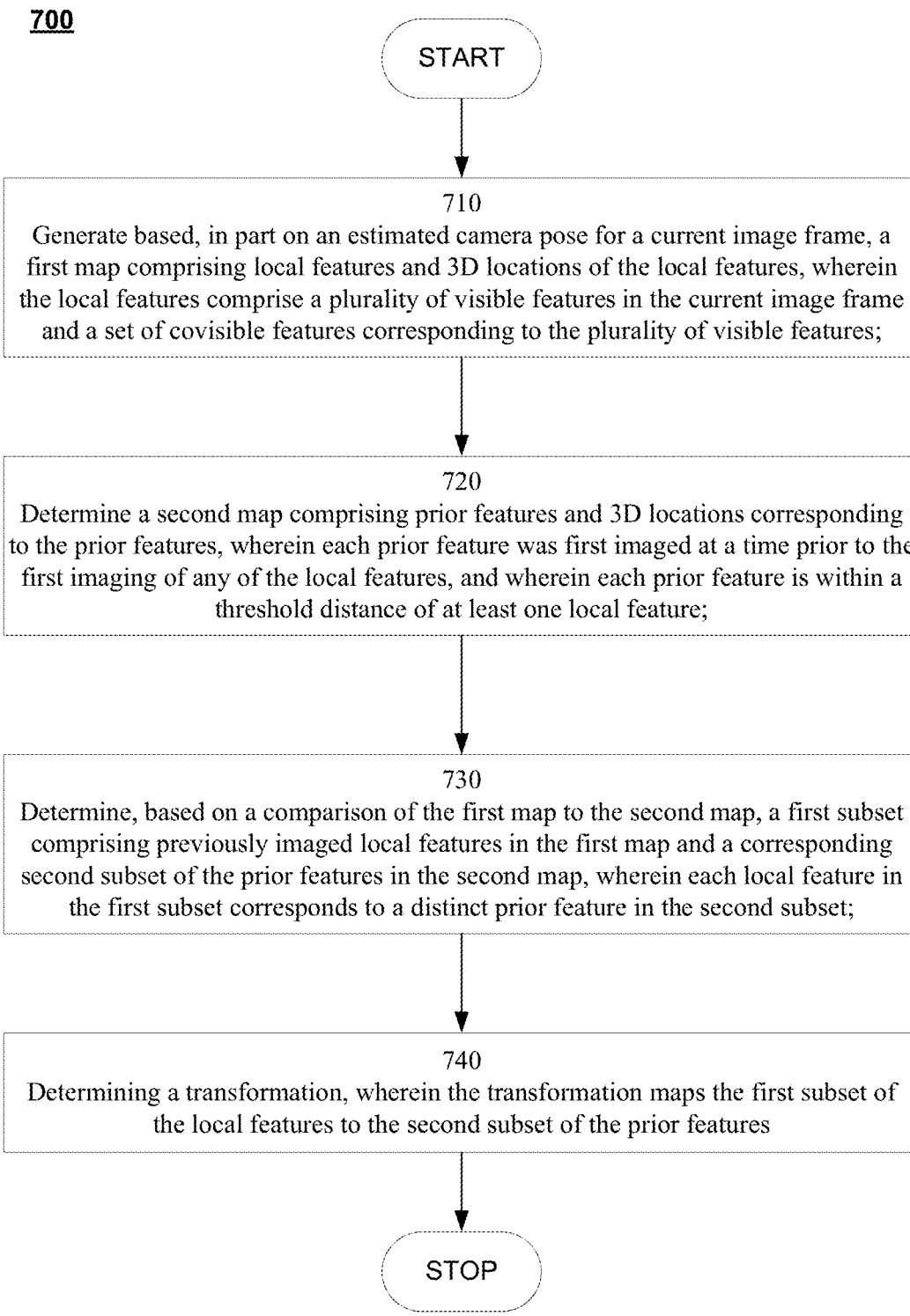
FIG. 7 shows a flowchart of an exemplary method for relocalization based, in part, on geometric information, in a manner consistent with disclosed embodiments.

FIG. 7 shows a flowchart of an exemplary method for relocalization based, in part, on geometric information, in a manner consistent with disclosed embodiments. In some embodiments, method 700 may be performed by UE 100, which may include camera(s) 180. In some embodiments, method 700 may be performed by processor(s) 150 and/or CV 155.

In some embodiments, in block 710, a first map comprising local features and 3D locations of the local features may be generated based, in part on an estimated camera pose for a current image frame. The local features in the first map may comprise a plurality of visible features in the current image frame and a set of covisible features corresponding to the plurality of visible features. In some embodiments, 3D locations corresponding to the local features may be determined based on the estimated camera pose by determining 3D locations corresponding to local features in the plurality of visible features. 3D locations corresponding to local features in the set of covisible features may be determined based on stored information for each of the covisible features.

In block 720, a second map comprising prior features and 3D locations corresponding to the prior features may be determined. Each prior feature selected for including in the second map: (i) may have been first imaged at a time prior to the time any of the local features was first imaged of, and (ii) may be located within a threshold distance of at least one local feature. In some embodiments, to determine the second map where each prior feature is within a threshold distance of at least one feature in the first map, the 3D space being imaged by the UE may be quantized into a plurality of quantization units. Further, one or more corresponding quantization units may be determined for each local feature. Prior features located within the determined quantization units may be added to the second map. In some embodiments, the quantization units may take the form of cubes of equal cube size. In some embodiments, the cube size may be varied inversely relative to a map scale, where the map scale is associated with the first map and the second map.

In block 730, a first subset comprising previously imaged local features in the first map and a corresponding second subset of the prior features in the second map may be determined based on a comparison of the first and second maps, where each local feature in the first subset may correspond to a distinct prior feature in the second subset. For example, local features in the first and prior features in the second subset may be determined by: determining that a first spatial arrangement associated with a plurality of the local features in the first map corresponds to a second spatial arrangement associated with a plurality of the prior features in the second map. The plurality of the local features in the first map may comprise the first subset and the corresponding plurality of the prior features in the second map may comprise the second subset. In some embodiments, the first spatial arrangement associated with the plurality of the local features in the first map may be determined, based, in part, on the corresponding 3D locations of the plurality of the local features and the second spatial arrangement associated with the plurality of the prior features in the second map is determined, based, in part, on the corresponding 3D locations of the plurality of the prior features.

In block 740, a transformation may be determined, where the transformation may the first subset of the local features to the second subset of the prior features. In some embodiments, the transformation mapping the first subset of the local features to the second subset of the prior features may be determined by using at least one of: Random Sample Consensus (RANSAC), and/or robust estimation, and/or exhaustive search, and/or Hough transforms. In some embodiments, the transformation mapping the first subset of the local features to the second subset of the prior features may be determined based on a translation or rigid motion model. In a more general settings, the transformation may be assumed to be a similarity transformation, which extends the rigid motion model with an arbitrary scale factor, an affine transformation, which is a general linear transformation plus a translation, or even a projective transformation, which could perhaps account for drift in the intrinsic parameters of the camera.

In some embodiments, the method may further comprise correcting the estimated camera pose based, in part, on the transformation to obtain a corrected camera pose. The method may further comprise updating the 3D locations of the local features in the first map based, in part, on the corrected camera pose. In some embodiments, the method may further comprise correcting an estimated trajectory of the UE based, in part, on the corrected camera pose.

In some embodiments, the first map may comprise a first plurality of local feature descriptors, where each local feature descriptor may be associated with a distinct local feature, and the second map may comprise a second plurality of prior feature descriptors, each prior feature descriptor may be associated with a distinct previously imaged feature; and the method may further comprise: comparing, for each local feature in the first subset, a corresponding local feature descriptor to a corresponding prior feature descriptor in the second subset; and refining the corrected camera pose based, in part, on the comparison.

The methodologies described herein in flow charts and message flows may be implemented by various means depending upon the application. For example, these methodologies may be implemented in hardware, firmware, software, or any combination thereof.

Although the disclosure is illustrated in connection with specific embodiments for instructional purposes, the disclosure is not limited thereto. Various adaptations and modifications may be made without departing from the scope Therefore, the spirit and scope of the appended claims should not be limited to the foregoing description.

What is claimed is:

1. A processor-implemented method on a user equipment (UE) comprising a camera, the method comprising:

generating based, in part on an estimated camera pose for a current image frame, a first map comprising local features and 3D locations of the local features, wherein the local features comprise a plurality of visible features in the current image frame and a set of covisible features corresponding to the plurality of visible features, wherein, for each feature in the plurality of visible features, corresponding covisible features comprise a subset of the local features visible from prior camera poses from which the feature is also visible;

determining a second map comprising prior features and 3D locations corresponding to the prior features, wherein each prior feature was first imaged at a time prior to the first imaging of any of the local features, and wherein each prior feature is within a threshold distance of at least one local feature;

determining, based on a comparison of the first map to the second map, a first subset comprising previously imaged local features in the first map and a corresponding second subset of the prior features in the second map, wherein each local feature in the first subset corresponds to a distinct prior feature in the second subset; and determining a transformation, wherein the transformation maps the first subset of the local features to the second subset of the prior features.

2. The method of claim 1, wherein determining the first subset and the corresponding second subset comprises:

determining that a first spatial arrangement associated with a plurality of the local features in the first map corresponds to a second spatial arrangement associated with a plurality of the prior features in the second map, wherein the plurality of the local features in the first map comprise the first subset and the plurality of the prior features in the second map comprise the second subset.

3. The method of claim 2, wherein:

the first spatial arrangement associated with the plurality of the local features in the first map is determined, based, in part, on the corresponding 3D locations of the plurality of the local features and the second spatial arrangement associated with the plurality of the prior features in the second map is determined, based, in part, on the corresponding 3D locations of the plurality of the prior features.

4. The method of claim 1, further comprising:

correcting the estimated camera pose based, in part, on the transformation to obtain a corrected camera pose.

5. The method of claim 4, further comprising:

updating the 3D locations of the local features in the first map based, in part, on the corrected camera pose.

6. The method of claim 4, wherein:
the first map comprises a first plurality of local feature descriptors, each local feature descriptor associated with a distinct local feature, and
the second map comprises a second plurality of prior feature descriptors, each prior feature descriptor associated with a distinct previously imaged feature; and wherein,
the method further comprises:
comparing, for each local feature in the first subset, a corresponding local feature descriptor to a corresponding prior feature descriptor in the second subset; and
refining the corrected camera pose based, in part, on the comparison.

7. The method of claim 4, further comprising:
correcting an estimated trajectory of the UE based, in part, on the corrected camera pose.

8. The method of claim 1, wherein the transformation mapping the first subset of the local features to the second subset of the prior features is determined based using at least one of:
Random Sample Consensus (RANSAC), or
robust estimation, or
exhaustive search, or
Hough transforms.

9. The method of claim 1, wherein the transformation mapping the first subset of the local features to the second subset of the prior features is determined based on a translation or rigid motion model.

10. The method of claim 1, wherein determining the second map where each prior feature is within a threshold distance of the at least one feature in the first map comprises:
quantizing a 3D space being imaged by the UE into a plurality of quantization units, and
determining at least one quantization unit corresponding to the at least one local feature, and
identifying prior features located within the at least one quantization unit.

11. The method of claim 10, wherein:
the quantization units are cubes of equal cube size, wherein the cube size varies inversely relative to a map scale, wherein the map scale is associated with the first map and the second map.

12. The method of claim 1, wherein generating 3D locations corresponding to the local features comprises:
determining 3D locations corresponding to local features in the plurality of visible features based on the estimated camera pose; and
obtaining 3D locations corresponding to local features in the set of covisible features based on stored information for each of the covisible features.

13. A User Equipment (UE) comprising:
at least one image sensor capable of capturing images; and
a processor coupled to the image sensor, wherein the processor is configured to:
generate based, in part on an estimated camera pose for a current image frame, a first map comprising local features and 3D locations of the local features, wherein the local features comprise a plurality of visible features in the current image frame and a set of covisible features corresponding to the plurality of visible features, wherein, for each feature in the plurality of visible features, corresponding covisible features comprise a subset of the local features visible from prior camera poses from which the feature is also visible;
determine a second map comprising prior features and 3D locations corresponding to the prior features, wherein each prior feature was first imaged at a time prior to the first imaging of any of the local features, and wherein each prior feature is within a threshold distance of at least one local feature;
determine, based on a comparison of the first map to the second map, a first subset comprising previously imaged local features in the first map and a corresponding second subset of the prior features in the second map, wherein each local feature in the first subset corresponds to a distinct prior feature in the second subset;
determine a transformation, wherein the transformation maps the first subset of the local features to the second subset of the prior features.

14. The UE of claim 13, wherein to determine the first subset and the corresponding second subset, the processor is configured to:
determine that a first spatial arrangement associated with a plurality of the local features in the first map corresponds to a second spatial arrangement associated with a plurality of the prior features in the second map, wherein the plurality of the local features in the first map comprise the first subset and the plurality of the prior features in the second map comprise the second subset.

15. The UE of claim 14, wherein:
the first spatial arrangement associated with the plurality of the local features in the first map is determined, based, in part, on the corresponding 3D locations of the plurality of the local features and the second spatial arrangement associated with the plurality of the prior features in the second map is determined, based, in part, on the corresponding 3D locations of the plurality of the prior features.

16. The UE of claim 13, wherein the processor is further configured to:
correct the estimated camera pose based, in part, on the transformation to obtain a corrected camera pose.

17. The UE of claim 16, wherein the processor is further configured to:
update the 3D locations of the local features in the first map based, in part, on the corrected camera pose.

18. The UE of claim 16, wherein:
the first map comprises a first plurality of local feature descriptors, each local feature descriptor associated with a distinct local feature, and
the second map comprises a second plurality of prior feature descriptors, each prior feature descriptor associated with a distinct previously imaged feature; and wherein,
the processor is further configured to:
compare, for each local feature in the first subset, a corresponding local feature descriptor to a corresponding prior feature descriptor in the second subset; and
refine the corrected camera pose based, in part, on the comparison.

19. The UE of claim 16, wherein the processor is further configured to:
correct an estimated trajectory of the UE based, in part, on the corrected camera pose.

20. The UE of claim 13, wherein the transformation mapping the first subset of the local features to the second subset of the prior features is determined based using at least one of:
Random Sample Consensus (RANSAC), or
robust estimation, or
exhaustive search, or
Hough transforms.

21. The UE of claim 13, wherein the transformation mapping the first subset of the local features to the second subset of the prior features is determined based on a translation or rigid motion model.

22. The UE of claim 13, wherein to determine the second map where each prior feature is within a threshold distance of the at least one feature in the first map, the processor is configured to:
quantize a 3D space being imaged by the UE into a plurality of quantization units, and
determine at least one quantization unit corresponding to the at least one local feature, and
identify prior features located within the at least one quantization unit.

23. The UE of claim 22, wherein:
the quantization units are cubes of equal cube size, wherein the cube size varies inversely relative to a map scale, wherein the map scale is associated with the first map and the second map.

24. The UE of claim 13, wherein to generate 3D locations corresponding to the local features, the processor is configured to:
determine 3D locations corresponding to local features in the plurality of visible features based on the estimated camera pose; and
obtain 3D locations corresponding to local features in the set of covisible features based on stored information for each of the covisible features.

25. An apparatus comprising:
image sensing means capable of capturing images;
means for generating based, in part on an estimated camera pose for a current image frame, a first map comprising local features and 3D locations of the local features, wherein the local features comprise a plurality of visible features in the current image frame and a set of covisible features corresponding to the plurality of visible features, wherein, for each feature in the plurality of visible features, corresponding covisible features comprise a subset of the local features visible from prior camera poses from which the feature is also visible;
means for determining a second map comprising prior features and 3D locations corresponding to the prior features, wherein each prior feature was first imaged at a time prior to the first imaging of any of the local features, and wherein each prior feature is within a threshold distance of at least one local feature;
means for determining, based on a comparison of the first map to the second map, a first subset comprising previously imaged local features in the first map and a corresponding second subset of the prior features in the second map, wherein each local feature in the first subset corresponds to a distinct prior feature in the second subset; and
means for determining a transformation, wherein the transformation maps the first subset of the local features to the second subset of the prior features.

26. The apparatus of claim 25, wherein means for determining the first subset and the corresponding second subset comprises:
means for determining that a first spatial arrangement associated with a plurality of the local features in the first map corresponds to a second spatial arrangement associated with a plurality of the prior features in the second map, wherein the plurality of the local features in the first map comprise the first subset and the plurality of the prior features in the second map comprise the second subset.

27. The apparatus of claim 25, wherein the transformation mapping the first subset of the local features to the second subset of the prior features is determined based using at least one of:
Random Sample Consensus (RANSAC), or
robust estimation, or
exhaustive search, or
Hough transforms.

28. A non-transitory computer readable medium comprising instructions, which when executed by a processor, cause the processor to:
generate based, in part on an estimated camera pose for a current image frame, a first map comprising local features and 3D locations of the local features, wherein the local features comprise a plurality of visible features in the current image frame and a set of covisible features corresponding to the plurality of visible features, wherein, for each feature in the plurality of visible features, corresponding covisible features comprise a subset of the local features visible from prior camera poses from which the feature is also visible;
determine a second map comprising prior features and 3D locations corresponding to the prior features, wherein each prior feature was first imaged at a time prior to the first imaging of any of the local features, and wherein each prior feature is within a threshold distance of at least one local feature;
determine, based on a comparison of the first map to the second map, a first subset comprising previously imaged local features in the first map and a corresponding second subset of the prior features in the second map, wherein each local feature in the first subset corresponds to a distinct prior feature in the second subset; and
determine a transformation, wherein the transformation maps the first subset of the local features to the second subset of the prior features.

29. The computer readable medium of claim 28, wherein the instructions to determine the first subset and the corresponding second subset, further cause the processor to:
determine that a first spatial arrangement associated with a plurality of the local features in the first map corresponds to a second spatial arrangement associated with a plurality of the prior features in the second map, wherein the plurality of the local features in the first map comprise the first subset and the plurality of the prior features in the second map comprise the second subset.

30. The computer readable medium of claim 28, wherein the transformation mapping the first subset of the local features to the second subset of the prior features is determined based using at least one of:
Random Sample Consensus (RANSAC), or
robust estimation, or
exhaustive search, or
Hough transforms.

* * * * *